United States Patent
Tajima et al.

[11] 4,153,339
[45] May 8, 1979

[54] ZOOM LENS

[75] Inventors: Akira Tajima, Kawasaki; Naoto Kawamura, Iragi, both of Japan

[73] Assignee: Canon Kabushiki Kaisha, Tokyo, Japan

[21] Appl. No.: 872,064

[22] Filed: Jan. 25, 1978

Related U.S. Application Data

[63] Continuation of Ser. No. 692,034, Jun. 2, 1976, abandoned.

[30] Foreign Application Priority Data

Jun. 6, 1975 [JP] Japan .................................. 50/68764

[51] Int. Cl.² .............................................. G02B 15/16
[52] U.S. Cl. .................................... 350/184; 350/176; 350/189; 350/207
[58] Field of Search ............... 350/176, 184, 186, 189, 350/207

[56] References Cited

U.S. PATENT DOCUMENTS

| | | | |
|---|---|---|---|
| 3,848,969 | 11/1974 | Tajima | 350/184 |
| 3,920,315 | 11/1975 | Linke | 350/189 X |

*Primary Examiner*—Paul A. Sacher
*Attorney, Agent, or Firm*—Toren, McGeady and Stanger

[57] ABSTRACT

In a zoom lens consisting of a first lens group having a negative refractive power and a second lens group having a positive refractive power with the air separation between the first and second groups being variable for zooming, there are provided two non-spherical surfaces positioned respectively in the first lens group and on the image side of a diaphragm in the second lens group at optional locations to prevent deterioration of aberrations which occurs when the image angle of the zoom lens is increased.

2 Claims, 30 Drawing Figures

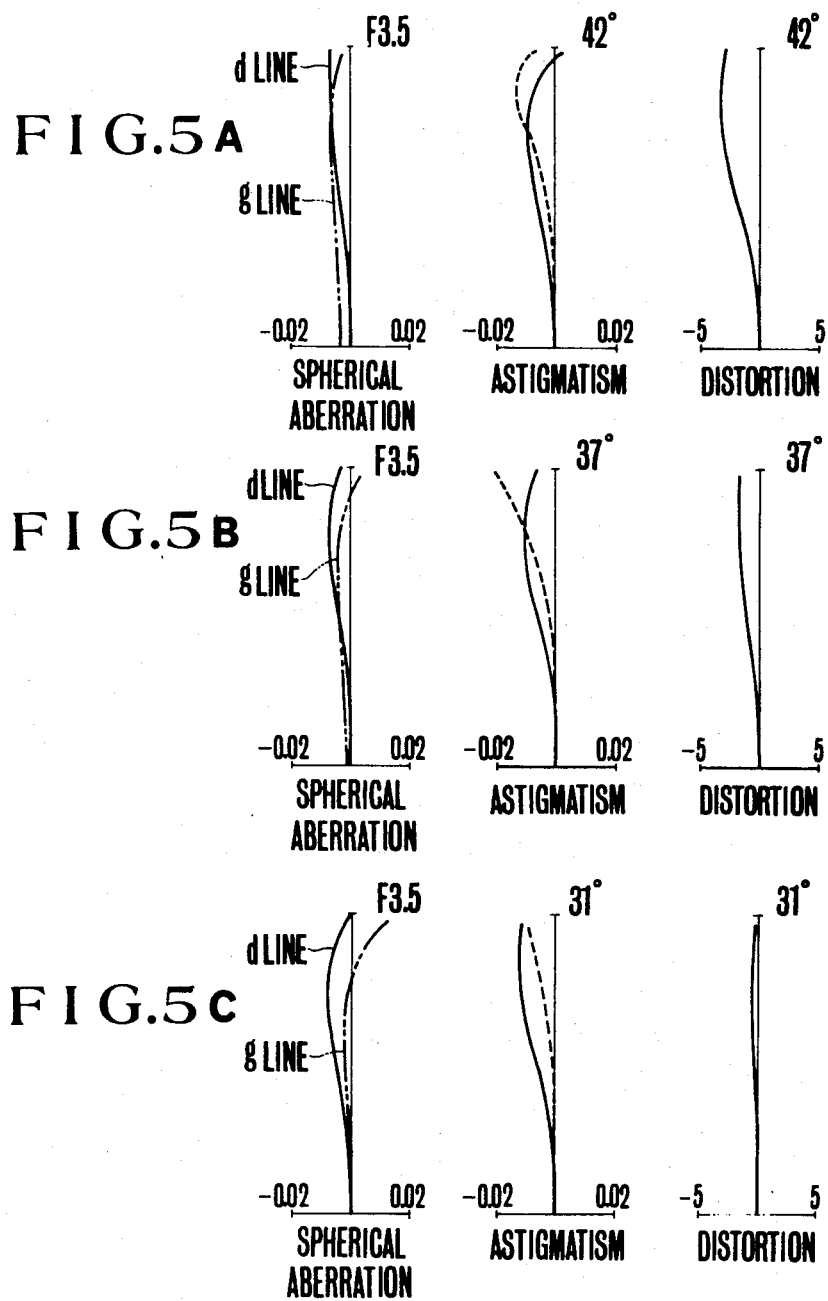

ZOOM LENS

This is a continuation of application Ser. No. 692,034, filed June 2, 1976 now abandoned.

BACKGROUND OF THE INVENTION

This invention relates to zoom lenses with greatly increased image angle, and more particularly to a zoom lens consisting of a movable front lens group having a negative focal length and a movable rear lens group having a positive focal length, the rear lens group having a diaphragm incorporated therein, and the front and rear lens groups being axially moved in differential relation to each other to vary the focal length of the entire lens system, which zoom lens has photographic capabilities extended toward the wide angle side while still preserving good stabilization of aberrations throughout the zooming range with limitation of the overall dimensions of the zoom lens to a minimum.

As shown in FIG. 1, a zoom system which may be conveniently considered as comprising a negative front lens I and a positive rear lens II, both of which are moved axially but in differential relation to each other to effect variation of the focal length of the overall lens system is, because of its being of inverted telephoto type, advantageous in providing an increased extent of image angle. As the maximum axial separation between the front and rear lenses I and II occurs at the wide angle setting for the maximum image angle, however, there is a disadvantage to this zoom system such that an increase in the diameter of the front lens I must be made for the extended range of image angle toward the maximum. This problem becomes serious in designing a zoom lens with a greatly increased image angle. If the provision for increasing the maximum image angle is forced to be compatible with severe limitation of the overall dimensions of the zoom lens to a minimum, the barrel type distortion at the wide angle setting is rapidly increased and its satisfactory correction is made difficult by any means.

SUMMARY OF THE INVENTION

The present invention employs nonspherical refracting surfaces for facilitating correction of not only distortion but other various aberrations in correlation therewith and is intended to provide a compact zoom lens which is well corrected for aberrations even in the extended range of image angle at the wide angle settings.

A zoom lens constructed in accordance with the present invention comprises a movable front lens group having a negative focal length and a movable rear lens group having a positive focal length with the axial air separation between the movable front lens group and the movable rear lens group being varied to effect variation of the focal length of the entire system, whereby use is made of two non-spherical surfaces provided at optionally selected surfaces in the front and rear lens groups respectively while a diaphragm being positioned therebetween.

The present inventors have found, with this configuration of the present invention, that despite the fact that the image angle at the wide angle setting is increased to as high as 84°, it is possible to achieve a very good stabilization of distortion as well as other various aberrations throughout the entire zooming range, while still limiting the overall dimensions to a miniumum. The zoom lens of the invention in the form of a mechanically compensated varifocal lens system, as it is capable of maintaining a constant image plane while its focal length varies throughout a range of axial movement of the front and rear lens groups, is suitable either for use particularly with a still camera or for use as a super-wide angle zoom lens for a cinematographic camera, or a television camera.

BRIEF DESCRIPTION OF THE DRAWINGS

FIGS. 5A, 5B and 5C are curves of aberration of the zoom lens of FIG. 4 at the wide angle, medium and telephoto settings respectively.

DETAILED DESCRIPTION OF THE PREFERRED EMBODIMENT

The zoom lens of the preferred embodiment of the present invention comprises a first lens group having a negative focal length and a second lens group having a positive focal length and having a diaphragm incorporated therein, whereby the axial air separation between the first and second lens groups is varied to effect variation of the focal length of the entire lens system, and wherein there are provided two non-spherical refracting surfaces respectively in the first lens group at an optionally selected surface or an i-th surface and in the second lens group behind the diaphragm at an optionally selected surface (or j-th surface) to achieve high standard of aberration correction, being characterized by the following relationships:

$$-3.0 < \frac{f_1}{f_w} < -1.17 \quad (1)$$

$$0.54 < \frac{l_w}{f_w} < 1.5 \quad (2)$$

(3) $\psi i > 0$ and $\psi j < 0$ (4) $hi\ \overline{h}i^3 \psi i + \overline{h}j\ hj^3\ \psi j < -0.05$ (5) $|hi^2 \overline{h}i^2 \psi i + hj^2 \overline{h}j^2 \psi j| < 0.15$ wherein $f_1$: the focal length of the first lens group;

$f_w$: the focal length of the entire system at the wide angle setting;

$l_w$: the axial separation between the first and second lens groups at the wide angle setting;

$\psi i$: the 3rd-order non-spherical coefficient at the i-th surface;

$\psi j$: the 3rd-order non-spherical coefficient at the j-th surface;

$hi$: the height of the point of incidence of a paraxial ray on the i-th surface from the optical axis;

$hj$: the height of the point of incidence of a paraxial ray on the j-th surface from the optical axis;

$hi$: the height of the point of incidence of a paraxially pupil ray on the i-th surface from the optical axis; and 2

$\overline{h}j$: the height of the point of incidence of a paraxially pupil ray on the j-th surface.

Conditions (1) and (2) concern a power distribution of the lens system. When the upper limit of condition (1) is violated, it is made more difficult to achieve satisfactory correction of distortion as well as other various aberrations. When the lower limit is violated, the size of the complete lens system is increased to contradict the above mentioned object of the invention which is to provide a compact zoom lens, though the aberration can be made more easily. The upper limit of condition (2) is also for limitation of the overall dimensions of the lens system to a minimum, while the lower limit of condition (2) is determined to secure a sufficient amount of axial movement of the zoom control lens groups, thereby it is avoided for the zoom ratio to be unduly decreased.

Figure 1:
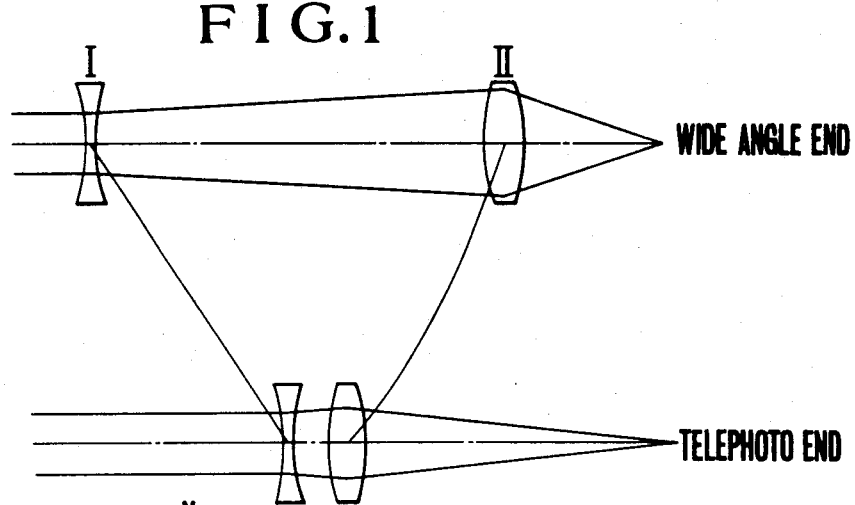
FIG 1 is a diagram of geometry considered in performance of a two component zoom system of the inverted telephoto type.
Figure 2:
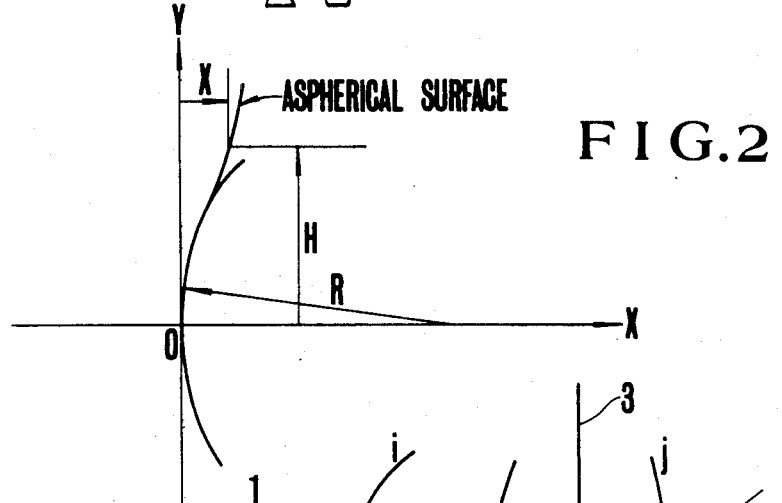
FIG. 2 is a graph showing the figuring operation for a non-spherical surface.

Conditions (3) to (5) concern figuring constants for the non-spherical surfaces. These quantities will be explained in detail below. The figuring of a non-spherical surface is generally expressed by use of co-ordinates X and Y, as shown in FIG. 2, where the abscissa X is parallel to the optical axis, and the ordinate is perpendicular to the optical axis, with the original point being coincident with the vertex of the non-spherical surface. Hence, the amount of deviation X of the non-spherical surface curve from the ordinate at the hight H of a point on the non-spherical surface from the optical axis may be expressed as:

$$X = \frac{(\frac{1}{R}) \times H^2}{1 + \sqrt{1 - (\frac{H}{R})^2}} + BH^4 + CH^6 + DH^8 + \ldots \quad (11)$$

wherein R is the radius of curvature of a paraxial part of the non-spherical surface at its vertex, and B, C and D are figuring constants. The first term on the right side of this equation (11) contains only one parameter R, namely, the radius of curvature of the paraxial part of the non-spherical surface. The second term contains a figuring constant B relates to the 3rd-order aspheric coefficient $\psi$ as follows:

$$\psi = 8(N'-N)B \quad (12)$$

wherein N is the refractive index of the medium containing the incident ray, and N' that of the medium containing the refracted ray.

The third term also contains a figuring constant C related to the 5th-order aspheric coefficient $\Omega$ as follows:

$$\Omega = 48(N'-N)C \quad (13)$$

Figure 3:
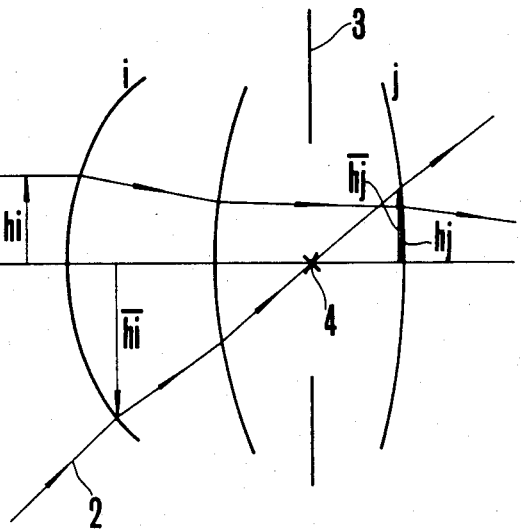
FIG. 3 is a diagram of geometry considered in tracing a paraxial ray and a paraxially pupil ray to derive an equation having figuring constants for non-spherical surfaces.

Now assuming that a non-spherical surface in question is formed by modifying a spherical surface having a curvature of value R, the corresponding amounts of variation of 3rd-order aberration coefficients, namely, spherical aberration coefficient (I), coma aberration coefficient (II), astigmatism aberration coefficient (III), sagittal curvature of field aberration coefficient (IV) and distortion coefficient (V) are functions of aspheric coefficient $\psi$ as follows:

$$\Delta I = h^4 \psi$$

$$\Delta II = h^3 \overline{h} \psi$$

$$\Delta III = h^2 \overline{h}^2 \psi$$

$$\Delta IV = h^2 \overline{h}^2 \psi$$

$$\Delta V = h\ \overline{h}^3 \psi$$

wherein h and $\overline{h}$ are the quantities selected for tracing rays with regard to the location and the aperture of the diaphragm one of the rays, namely, the ray 1, as shown in FIG. 3, goes along the optical axis and cuts the individual refracting surfaces (i, j) at respective heights, h, to intersect the optical axis at the image focus, while the other ray, namely, the ray 2 enters the system under an angle of obliquity and passes at the center 4 of the aperture of the diaphragm 3, the points of incidence on the individual surfaces (i, j) being at heights, $\overline{h}$.

With the foregoing in mind, it is understandable that condition (3) assists in correction of barrel-type distortion or positive distortion due to the decrease in relative aperture of the lens system by production of a negative distortion resulting from the modification of an optionally selected surface (the i-th surface) in the first lens group and of an optionally selected surface (the j-th surface) on the image side of the diaphragm in the second lens group to the respective non-spherical ones. Of the other aberrations, I, II, III and IV with their amounts of variation caused by the introduction of the i-th and j-th non-spherical surfaces, there are two aberration variations namely, $\Delta III$ and $\Delta IV$ which are most difficult to be compensated for by other lens surfaces. Even in this respect, condition (3) is effective for achieving good correction of astigmatism III and field curvature IV, as both non-spherical surfaces (the i-th and j-th surfaces) provide respective amounts of variation of astigmatism and field curvature which can be cancelled out with each other. Those facts constitute a reason why the diaphragm is placed between the i-th and j-th nonspherical surfaces. As is evident from FIG. 3, the sign of the quantity $\overline{h}$ is reversed at the diaphragm ($\overline{h}i < 0$, $\overline{h}j > 0$), so that when $\psi i > 0$ and $\psi j < 0$, it is possible to make both of $\alpha Vi$ and $\alpha Vj$ negative as is understandable from the formulae (14). Formulae (14) also give $\Delta IIIj>0$, $\Delta IVi<0$, $\Delta IIIj<0$, $\Delta IVj<0$. This leads to establish the following equations (15):

$$\left.\begin{array}{l} \Delta IIIi + \Delta IIIj = 0 \\ \Delta IVi + \Delta IVj = 0 \\ \Delta Vi + \Delta Vj < 0 \end{array}\right\} \quad (15)$$

Condition (4) concerns the sum of the amounts of variation of 3rd-order distortion aberration coefficients due to the introduction of the terms only for the i-th and j-th non-spherical surfaces and operates within the framework of condition (3) to limit the acceptable range of 3rd-order non-spheric coefficients $\psi i$ and $\psi j$ or figuring constants Bi and Bj. When this limit is violated, the residual distortion becomes so large that a remarkable compactness and improvement in image quality are difficult to achieve.

Condition (5) concerns the sum of the amounts of variation of 3rd -order astigmatism III and curvature of image field IV aberration coefficients due to the introduction of the terms only for the i-th and j-th non-spherical surfaces, and operates within the framework of condition (3) and in combination with condition (4) to limit the acceptable range of combined $\psi i$ and $\psi j$, or combined Bi and Bj. When this limit is violated, satisfactory correction of astigmatism and curvature of image field becomes difficult.

The present invention will be further illustrated in connection with six examples of a specific zoom lens of the preferred form of the present invention. In the following description and in the accompanying drawing, the focal length of the entire lens system is designated by f, the focal length of the front lens group by $f_1$, the focal length of the rear lens group by $f_2$, and f-number by F. The radii of curvature R, the axial separations, D, between the successive refracting surfaces are expressed with the subscripts to identity the particular surface and axial separation, numbered from front to rear. The plus and minus values of the radii, R, indicates surfaces convex and concave toward the front respectively. The refractive indices of the materials from which the various lens elements are made are designated by N, and their Abbe numbers are designated by Vd.

Figure 4A:
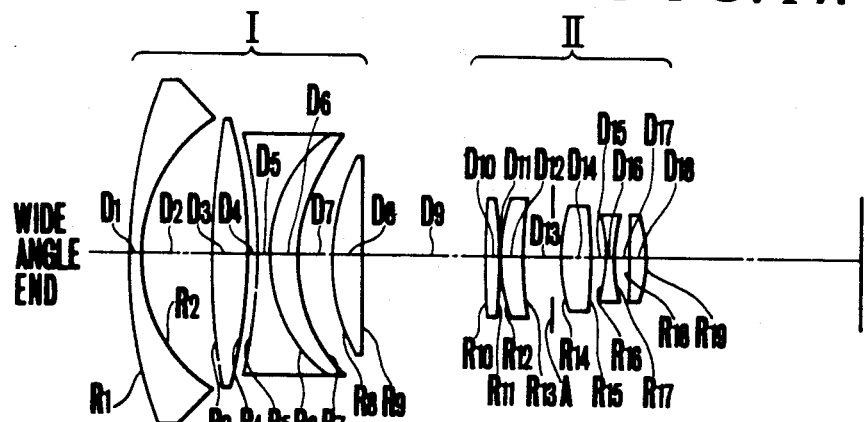
FIG. 4 is a block diagram of a first example of a zoom lens in the preferred form of the present invention in three different operative positions, i.e., at wide angle, medium and telephoto settings respectively shown in FIGS. 4A, 4B and 4C.
Figure 4B:
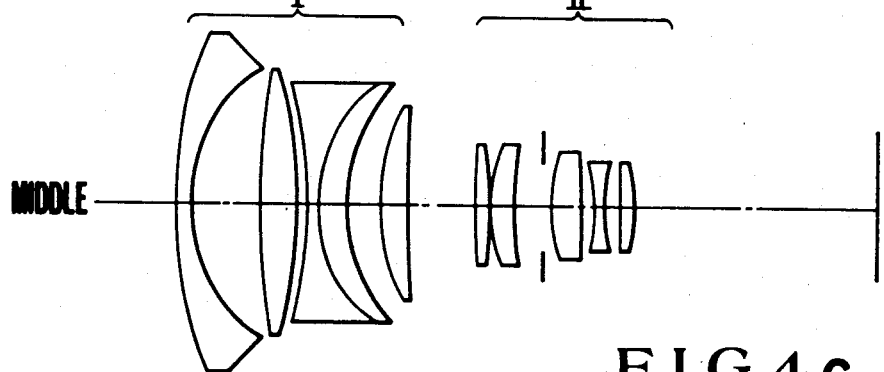
Figure 4C:
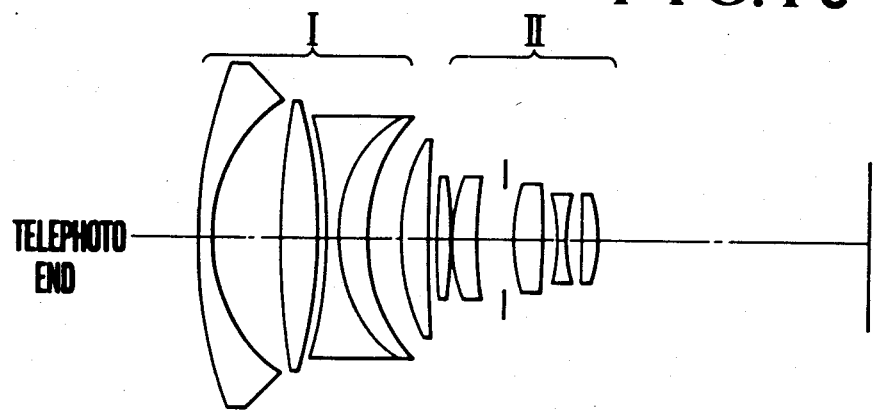

FIGS. 4A, 4B and 4C show a first example of the preferred embodiment of the zoom lens according to the present invention at the wide angle setting, a medium setting and the telephoto setting respectively. In this example, a number of lens elements with their surfaces $R_1$ to $R_9$ constitute a first lens group having a negative refractive power, and a number of lens elements with their surface $R_{10}$ to $R_{19}$ constitute a second lens group having a positive refractive power. The surfaces $R_1$ and $R_{19}$ are non-spherical. The diaphragm aperture is located between the surfaces $R_{13}$ and $R_{14}$. With this zoom lens, it is possible to vary the focal length of the entire lens system by varying the axial separation $D_9$ between the surfaces $R_9$ and $R_{10}$. The states of correction of spherical aberrations, astigmatism and distortion of the zoom lens of FIG. 4 when adjusted to the wide angle, medium and telephoto settings are shown in FIGS. 5A, 5B and 5C respectively.

EXAMPLE 1

The first example of the zoom lens may be constructed in accordance with the numerical data given below.

f=1.0-1.5 F/3.5 Image angle: 84°-62°

| | No. | R | D | N | Vd |
|---|---|---|---|---|---|
| | 1 | 4.0814 | 0.0958 | 1.72342 | 38.0 |
| | 2 | 1.1436 | 0.4972 | | |
| | 3 | 6.0310 | 0.2488 | 1.61293 | 37.0 |
| | 4 | −3.5394 | 0.0667 | | |
| | 5 | −3.7009 | 0.0833 | 1.77250 | 49.6 |
| $f_1$ = | 6 | 1.0459 | 0.2012 | 1.71736 | 29.5 |
| −1.6667 | 7 | 1.2405 | 0.2432 | | |
| | 8 | 1.5182 | 0.1963 | 1.64769 | 33.8 |
| | 9 | 13.2818 | 0.8346~0.0096 | | |
| | 10 | 5.0197 | 0.1027 | 1.60729 | 59.4 |
| | 11 | −4.4345 | 0.0042 | | |
| | 12 | 1.1150 | 0.1763 | 1.60311 | 60.7 |
| | 13 | 2.9677 | 0.2698 | | |
| $f_2$ = | 14 | 1.4990 | 0.2062 | 1.60311 | 60.7 |
| 1.4844 | 15 | −6.7547 | 0.1079 | | |
| | 16 | −1.1877 | 0.0625 | 1.80518 | 25.4 |
| | 17 | 1.883 | 0.1025 | | |
| | 18 | 8.9553 | 0.1257 | 1.70154 | 41.1 |
| | 19 | −0.8623 | | | |

Lens Separation during Zooming

| f | $D_9$ |
|---|---|
| 1.0 | 0.8346 |
| 1.2 | 0.4221 |
| 1.5 | 0.0096 |

Figuring constants for the non-spherical surfaces at $R_1$ and $R_{19}$ $$\begin{cases} B_1 = 0.02181 \\ C_1 = 0.001423 \end{cases} \text{or} \begin{cases} \psi_1 = 0.1262 \\ \Omega_1 = 0.0494 \end{cases}$$

$$\begin{cases} B_{19} = 0.07964 \\ C_{19} = 0.00004667 \end{cases} \text{or} \begin{cases} \psi_{19} = -0.4470 \\ \Omega_{19} = -0.001538 \end{cases}$$

The diaphragm aperture is located at a distance of 0.2073 rearwardly from surface $R_{13}$

| | α | h | ᾱ | h̄ |
|---|---|---|---|---|
| 1 | 0.000000 | 1.000000 | −1.000000 | −1.175291 |
| 2 | 0.177250 | 9.990144 | −1.208320 | −1.108100 |
| 3 | −0.449092 | 1.213420 | −0.507362 | −0.855854 |
| 4 | −0.325772 | 1.263665 | −0.594342 | −0.764187 |
| 5 | −0.106940 | 1.270802 | −0.726678 | −0.715687 |
| 6 | −0.372195 | 1.288301 | −0.577293 | −0.688546 |
| 7 | −0.440112 | 1.339872 | −0.540994 | −0.625154 |
| 8 | −1.214912 | 1.635324 | −0.179490 | −0.581504 |
| 9 | −0.517247 | 1.696958 | −0.427572 | −0.530555 |
| 10 | −0.600000 | 2.197729 | −0.401699 | −0.195290 |
| 11 | −0.334114 | 2.219084 | −0.425326 | −0.168105 |
| 12 | −0.030217 | 2.219210 | −0.448347 | −0.166237 |
| 13 | 1.170211 | 2.090534 | −0.538269 | −0.107050 |
| AP* | 0.745367 | 1.936054 | −0.516514 | 0.000000 |
| 14 | 0.745367 | 1.889469 | −0.516514 | 0.032282 |
| 15 | 1.505554 | 1.695841 | −0.503526 | 0.097040 |
| 16 | 1.656971 | 1.517007 | −0.494862 | 0.150450 |
| 17 | 0.628501 | 1.495247 | −0.596861 | 0.171114 |
| 18 | −0.384705 | 1.534695 | −0.712811 | 0.244207 |
| 19 | −0.264480 | 1.554234 | −0.693680 | 0.295453 |

-continued

| α | h | $\bar{\alpha}$ | $\bar{h}$ |
|---|---|---|---|
| 1.00000 | | −0.453308 | |

*Aperture plane wherein the initial values for α, h and $\bar{\alpha}$ when f=1.0 with object at infinity are taken as α=0, h=1, and $\bar{\alpha}$=−1. α and $\bar{\alpha}$ are the values of tangent of angles under which respective paraxial rays intersect the optical axis. The angle has the positive sign when a clockwise turn will bring a ruler from the direction of the optical axis into that of the ray, and the negative sign if the turn is counter-clockwise. The value h, $\bar{h}$ has the positive sign when the measure is upward from the optical axis, and it is negative when the measure is downward.

The aberration coefficients of the zoom lens in Example 1 are as follows:

| | Wide Angle Setting | Medium Setting | Telephoto Setting |
|---|---|---|---|
| L | 0.002202 | 0.000167 | −0.003443 |
| T | −0.000004 | 0.000091 | 0.000210 |
| LS | −0.017420 | −0.011356 | −0.006668 |
| I | 1.57312 | 1.91693 | 2.28809 |
| II | −0.00553 | 0.04974 | 0.12004 |
| III | −0.03306 | −0.02839 | −0.02100 |
| P | 0.11474 | 0.11474 | 0.11474 |
| V | 0.22816 | 0.11046 | 0.03829 |
| $I^s$ | −0.09097 | −0.07174 | −0.04226 |
| I* | −134.26523 | −190.19276 | −217.32985 |
| II* | −18.41178 | −19.58180 | −7.22936 |
| $I_F$ | −2.53966 | −2.03001 | 0.51001 |
| $II_P$ | 0.67436 | 0.62257 | 0.74373 |
| $\hat{I}$ | −7.81431 | −8.73541 | −8.83642 |
| $\hat{II}$ | 0.01116 | −0.27105 | −0.37760 |
| $\hat{III}$ | 0.31518 | 0.20588 | 0.10551 |
| $\hat{IV}$ | −0.32360 | −0.31193 | −0.31474 |
| $\hat{V}$ | −1.11302 | −0.47120 | −0.17670 |
| $IIz$ | 0.28456 | 0.33372 | 0.38746 |
| $Iz$ | 3.28758 | 3.68991 | 4.33780 |
| $IIz$ | −0.00456 | 0.06309 | 0.10428 | wherein
I: 3rd-order spherical aberration
II: 3rd-order coma
III: 3rd-order astigmatism
P: 3rd-order petzval sum
V: 3rd-order distortion
$I^s$: Pupil spherical aberration
I*: 5th-order zonal spherical aberration
II*: 5th-order zonal coma
IF: 5th-order oblique meridional spherical aberration
IIp: 5th-order oblique arrowlike coma
$\hat{I}$: 5th-order oblique spherical aberration
$\hat{II}$: 5th-order oblique coma
$\hat{III}$: 5th-order oblique astigmatism
$\hat{IV}$: 5th-order oblique field curvature
$\hat{V}$: 5th-order oblique distortion
$II\overset{*}{z}$: 5th-order additional zonal coma
Iz: 5th-order additional spherical aberration
IIz: 5th-order additional coma

EXAMPLE 2

Figure 6A:
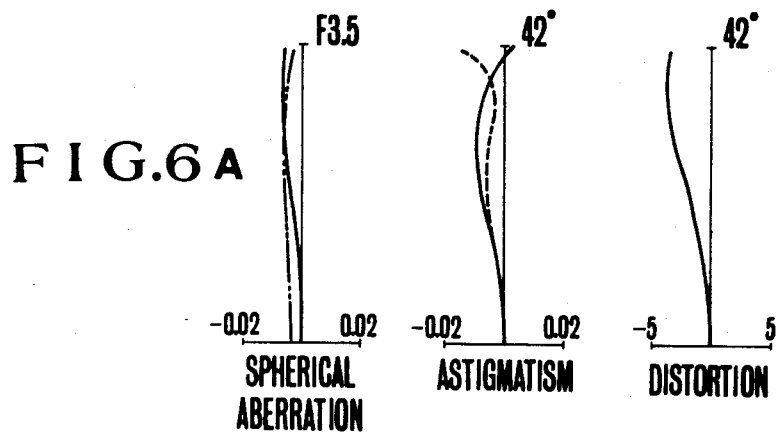
FIGS. 6A, 6B and 6C are curves of aberration of a second example of a zoom lens according to the invention at wide angle, medium and telephoto settings respectively.
Figure 6B:
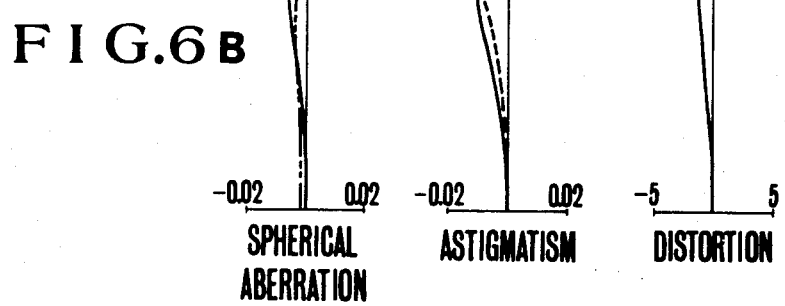
Figure 6C:
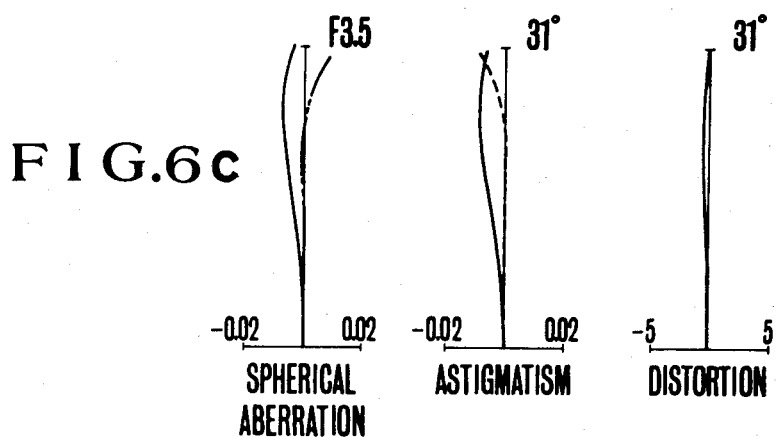

The second example of the zoom lens though not shown in the drawings may be constructed in accordance with the numerical data given below. In this example, the 2nd and 19th surfaces are non-spherical. The states of correction of aberrations achieved in this example at the wide angle setting, a medium setting and the telephoto setting are shown in FIGS. 6A, 6B and 6C respectively.

f = 1.0−1.5 F/3.5 Image angle: 84°−62°

| | No. | R | D | N | Vd |
|---|---|---|---|---|---|
| | 1 | 2.6666 | 0.0958 | 1.72342 | 38.0 |
| | 2 | 1.1655 | 0.519 | | |
| | 3 | −14.0131 | 0.2392 | 1.61293 | 37.0 |
| $f_1$ = | 4 | −2.7236 | 0.026 | | |
| −1.6667 | 5 | −7.8433 | 0.8333 | 1.77250 | 49.6 |
| | 6 | 0.9109 | 0.1842 | 1.71736 | 29.5 |
| | 7 | 1.1010 | 0.2706 | | |
| | 8 | 1.3436 | 0.1776 | 1.64769 | 33.8 |
| | 9 | 4.6958 | 0.9471 ~ 0.1221 | | |
| | 10 | 3.3854 | 0.1266 | 1.60729 | 59.4 |
| | 11 | −2.6890 | 0.0417 | | |
| | 12 | 0.9884 | 0.1731 | 1.60311 | 60.7 |
| $f_2$ = | 13 | 1.4550 | 0.2558 | | |
| 1.4844 | 14 | 1.4432 | 0.1890 | 1.60311 | 60.7 |
| | 15 | −6.6610 | 0.0753 | | |
| | 16 | −1.1519 | 0.0625 | 1.80518 | 25.4 |
| | 17 | 1.2869 | 0.1295 | | |
| | 18 | −21.6055 | 0.1308 | 1.70154 | 41.1 |
| | 19 | −0.8144 | | | |

Lens Separation during Zooming

| f | $D_9$ |
|---|---|
| 1.0 | 0.9471 |
| 1.2 | 0.5346 |
| 1.5 | 0.1221 |

Figuring constants for the non-spherical surfaces at $R_2$ and $R_{19}$ $$\begin{cases} B2 = -0.006216 \\ C2 = -0.002201 \end{cases} \text{or} \begin{cases} \psi 2 = 0.03597 \\ \Omega 2 = 0.07642 \end{cases}$$

$$\begin{cases} B19 = 0.1118 \\ C19 = 0.00008784 \end{cases} \text{or} \begin{cases} \psi 19 = -0.6470 \\ \Omega 19 = -0.002958 \end{cases}$$

The diaphragm aperture is located at a distance of 0.1932 rearwardly from surface R13.

| No. | α | h | $\bar{\alpha}$ | $\bar{h}$ |
|---|---|---|---|---|
| 1 | 0.000000 | 1.000000 | −1.000000 | −1.272124 |
| 2 | 0.271904 | 0.984880 | −1.345895 | −1.197283 |
| 3 | −0.339407 | 1.161021 | −0.602747 | −0.884477 |
| 4 | −0.390190 | 1.218877 | −0.564060 | −0.800840 |
| 5 | −0.115886 | 1.221886 | −0.744286 | −0.781515 |
| 6 | −0.236233 | 1.232993 | −0.667313 | −0.750141 |
| 7 | −0.310867 | 1.266329 | −0.621906 | −0.683451 |
| 8 | −0.135959 | 1.573700 | −0.176595 | −0.635667 |
| 9 | −0.377330 | 1.614374 | −0.483030 | −0.583599 |
| 10 | −0.600000 | 2.182661 | −0.402534 | −0.202342 |
| 11 | −0.208465 | 2.199075 | −0.438831 | −0.167788 |
| 12 | 0.288175 | 2.197875 | <0.476724 | −0.165801 |
| 13 | 1.629246 | 2.021940 | −0.577891 | −0.103398 |
| 14 | 0.791107 | 1.819610 | −0.535030 | 0.033439 |
| 15 | 1.551492 | 1.636677 | −0.521056 | 0.094876 |
| 16 | 1.699683 | 1.508719 | −0.512466 | 0.133456 |
| 17 | 0.645121 | 1.486383 | −0.605749 | 0.154429 |
| 18 | −0.284842 | 1.523271 | −0.702368 | 0.245388 |
| 19 | −0.334303 | 1.548970 | −0.710336 | 0.299994 |
| | 1.000000 | | −0.451917 | |

Aberration Coefficient in Example 2

|   | Wide Angle Setting | Medium Setting | Telephoto Setting |
|---|---|---|---|
| L | 0.002021 | −0.000101 | −0.003909 |
| T | 0.000926 | 0.000949 | 0.000977 |
| LS | −0.016530 | −0.010700 | −0.006223 |
| I | 1.44684 | 1.66650 | 1.75991 |
| II | −0.16516 | −0.15192 | −0.16364 |
| III | −0.01736 | −0.03049 | −0.04492 |
| P | 0.10872 | 0.10872 | 0.10872 |
| V | 0.20219 | 0.08917 | 0.02057 |
| $I^s$ | −0.06088 | −0.05659 | −0.03560 |
| $I^*$ | −130.38641 | −167.71822 | −118.14091 |
| $II^*$ | −14.80253 | −13.53817 | 5.25466 |
| $I_F$ | −1.04452 | −0.46237 | 2.17340 |
| $II_P$ | 1.57484 | 1.49856 | 1.53195 |
| $\hat{I}$ | −6.69176 | −7.56540 | −7.63811 |
| $\hat{II}$ | 1.12728 | 0.79455 | 0.57939 |
| $\hat{III}$ | 0.19348 | 0.25959 | 0.22388 |
| $\hat{IV}$ | −0.44489 | −0.25315 | −0.19174 |
| $\hat{V}$ | −0.66883 | −0.30425 | −0.12162 |
| $II_Z$ | 0.26209 | 0.32896 | 0.40301 |
| $I_Z$ | 4.06200 | 4.62270 | 5.55208 |
| $II_Z$ | −0.25678 | −0.18014 | −0.13746 |

EXAMPLE 3

Figure 7A:
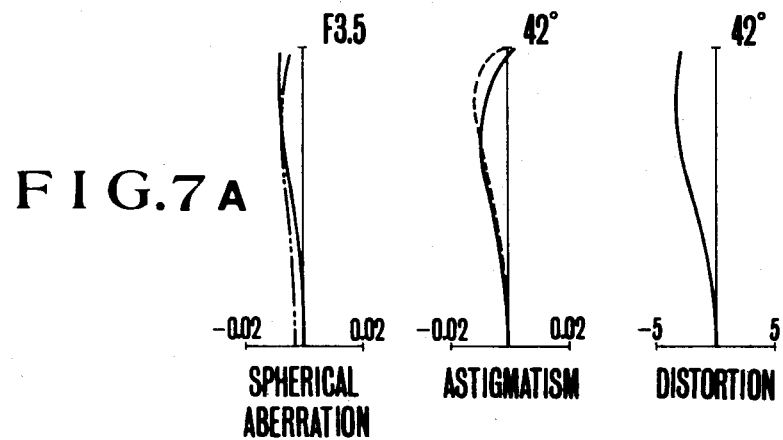
FIGS. 7A, 7B and 7C are curves of aberration of a third example of a zoom lens of the invention at wide angle, medium and telephoto settings respectively.
Figure 7B:
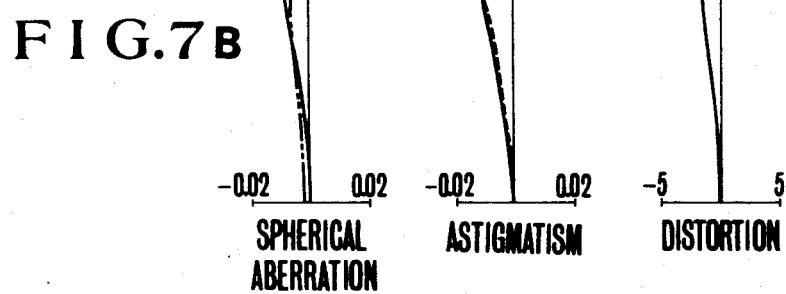
Figure 7C:
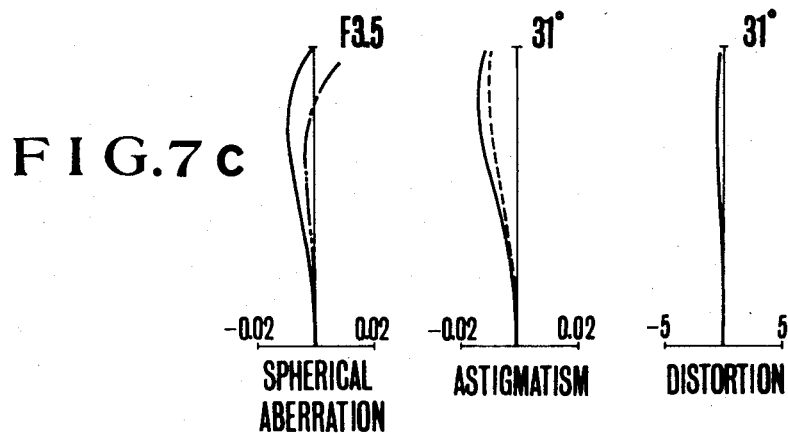

The third examples of the zoom lens though not shown in the drawings may be constructed in accordance with the numerical data given below. In this example, the 1st and 18th surfaces are non-spherical. The states of correction of aberrations achieved in this example at the wide angle setting, a medium setting and the telephoto setting are shown in FIGS. 7A, 7B and 7C respectively.

f = 1.0–1.5 f/3.5 Image Angle: 84°–62°

|   | No. | R | D | N | Vd |
|---|---|---|---|---|---|
|  | 1 | 4.3842 | 0.0958 | 1.72342 | 38.0 |
|  | 2 | 1.2118 | 0.5087 |  |  |
|  | 3 | 10.0526 | 0.2553 | 1.61293 | 37.0 |
| $f_1 =$ | 4 | −4.0175 | 0.0772 |  |  |
| −1.6667 | 5 | −4.4334 | 0.0833 | 1.77250 | 49.6 |
|  | 6 | 1.0323 | 0.2002 | 1.71736 | 29.5 |
|  | 7 | 1.2096 | 0.2483 |  |  |
|  | 8 | 1.5448 | 0.1931 | 1.64769 | 33.8 |
|  | 9 | 25.0021 | 0.8279∼0.0042 |  |  |
|  | 10 | 3.8104 | 0.1032 | 1.60729 | 59.4 |
|  | 11 | −4.5371 | 0.0042 |  |  |
|  | 12 | 1.0844 | 0.1760 | 1.60311 | 60.7 |
|  | 13 | 2.3253 | 0.2681 |  |  |
| $f_2 =$ | 14 | 1.4084 | 0.2059 | 1.60311 | 60.7 |
| 1.4844 | 15 | −5.2219 | 0.0976 |  |  |
|  | 16 | −1.2283 | 0.0625 | 1.80518 | 25.4 |
|  | 17 | 1.1653 | 0.1039 |  |  |
|  | 18 | 93.5756 | 0.1327 | 1.70154 | 41.1 |
|  | 19 | −0.8593 |  |  |  |

Lens Separation during Zooming

| f | $D_9$ |
|---|---|
| 1.0 | 0.8279 |
| 1.2 | 0.4154 |
| 1.5 | 0.0042 |

Figuring constants for the non-spherical surfaces at $R_1$ and $R_{18}$ $$\begin{cases} B_1 = 0.01987 \\ C_1 = 0.001091 \end{cases} \text{or} \begin{cases} \psi_1 = 0.1150 \\ \Omega_1 = 0.03788 \end{cases}$$

$$\begin{cases} B_{18} = -0.09839 \\ C_{18} = -0.00004902 \end{cases} \text{or} \begin{cases} \psi_{18} = -0.5522 \\ \Omega_{18} = -0.001378 \end{cases}$$

The diaphragm aperture is located at a distance of 0.2056 rearwardly from the surface $R_{13}$.

| No. | α | h | $\bar{\alpha}$ | $\bar{h}$ |
|---|---|---|---|---|
| 1 | 0.000000 | 1.000000 | −1.000000 | −1.185217 |
| 2 | 0.165005 | 0.990825 | −1.195567 | −1.118736 |
| 3 | −0.426483 | 1.207762 | −0.527720 | −0.850303 |
| 4 | −0.352843 | 1.263618 | −0.579565 | −0.758556 |
| 5 | −0.160061 | 1.275977 | −0.695293 | −0.705868 |
| 6 | −0.382396 | 1.293955 | −0.572472 | −0.677954 |
| 7 | −0.451509 | 1.346599 | −0.536261 | −0.615428 |
| 8 | −1.250101 | 1.656994 | −0.171265 | −0.572899 |
| 9 | −0.555389 | 1.722085 | −0.41179 | −0.524674 |
| 10 | −0.600000 | 2.218835 | −0.397887 | −0.195257 |
| 11 | −0.246366 | 2.234648 | −0.429007 | −0.167720 |
| 12 | 0.052738 | 2.234429 | −0.451456 | −9.165839 |
| 13 | 1.395504 | 2.092178 | −0.543694 | −0.106140 |
| 14 | 0.752864 | 1.890312 | −0.516165 | 0.032260 |
| 15 | 1.562341 | 1.689696 | −0.502350 | 0.096766 |
| 16 | 1.757495 | 1.518240 | −0.491174 | 0.144683 |
| 17 | 0.762249 | 1.491849 | −0.586018 | 0.164972 |
| 18 | −0.268576 | 1.519767 | −0.700009 | 0.237735 |
| 19 | −0.257183 | 1.539828 | −0.698226 | 0.292200 |
|  | 1.000000 |  | −0.459662 |  |

Aberration Coefficient in Example 3

|   | Wide Angle Setting | Medium Setting | Telephoto Setting |
|---|---|---|---|
| L | 0.001922 | −0.000174 | −0.003887 |
| T | 0.000219 | 0.000328 | 0.000465 |
| LS | −0.017853 | −0.011629 | −0.006820 |
| I | 1.67604 | 2.08229 | 2.54863 |
| II | 0.11397 | 0.19546 | 0.30451 |
| III | −0.00703 | 0.00066 | 0.01044 |
| P | 0.10439 | 0.10439 | 0.10439 |
| V | 0.22980 | 0.11307 | 0.04138 |
| $I^s$ | −0.14296 | −0.09539 | −0.05104 |
| $I^*$ | −125.41069 | −183.72966 | −229.24836 |
| $II^*$ | −21.85615 | −25.97799 | −21.00143 |
| $I_F$ | −4.41582 | −4.57400 | −3.20459 |
| $II_P$ | −0.05957 | −0.15126 | −0.07310 |
| $\hat{I}$ | −9.71252 | −11.37773 | −12.79016 |
| $\hat{II}$ | −0.94936 | −1.23477 | −1.35560 |
| $\hat{III}$ | 0.07081 | −0.00426 | −0.06138 |
| $\hat{IV}$ | −0.57903 | −0.54439 | −0.50422 |
| $\hat{V}$ | −1.12452 | −0.49746 | −0.20039 |
| $II^*_Z$ | 0.22451 | 0.29104 | 0.39829 |
| $I_Z$ | 2.11750 | 2.22490 | 2.35043 |
| $II_Z$ | 0.18435 | 0.23832 | 0.25974 |

EXAMPLE 4

Figure 8A:
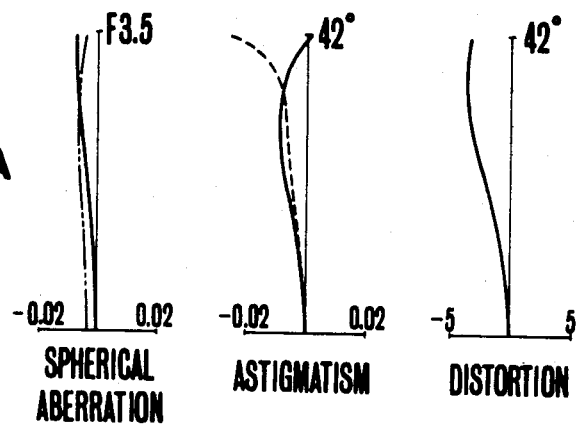
FIGS. 8A, 8B and 8C are curves of aberration of a fourth example of a zoom lens of the invention at wide angle, medium and telephoto settings respectively.
Figure 8B:
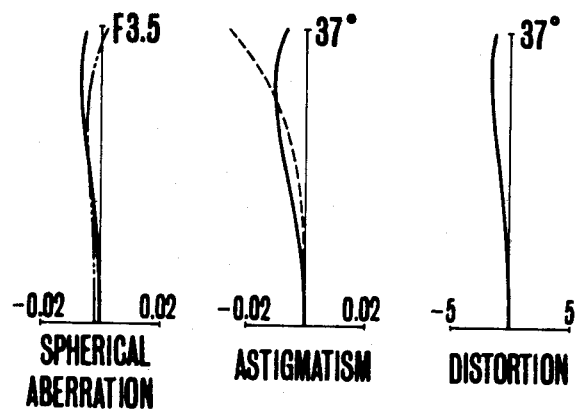
Figure 8C:
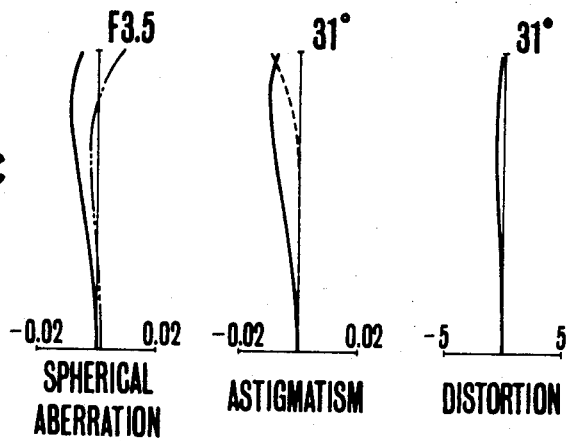

The fourth example of the zoom lens of the invention though not shown in the drawings may be constructed in accordance with the numerical data given below. In this example, the 3rd and 19th surfaces are non-spherical. The states of correction of aberrations achieved in this example at the wide angle setting, a medium setting and the telephoto setting are shown in FIGS. 8A, 8B and 8C respectively.

f = 1.0–1.5 F/3.5 Image angle: 84°–62°

| No. | R | D | N | Vd |
|---|---|---|---|---|
| $f_1 =$ −1.6667 { 1 | 2.6858 | 0.0958 | 1.72342 | 38.0 |
| 2 | 1.1649 | 0.5093 | | |
| 3 | −3718.6930 | 0.2570 | 1.61293 | 37.0 |
| 4 | −3.4243 | 0.0804 | | |
| 5 | −4.6422 | 0.0833 | 1.77250 | 49.6 |
| 6 | 0.9940 | 0.2019 | 1.71736 | 29.5 |
| 7 | 1.1146 | 0.2637 | | |
| 8 | 1.4576 | 0.1927 | 1.64769 | 33.8 |
| 9 | 12.0696 | 0.8728∼0.0478 | | |
| $f_2 =$ 1.4844 { 10 | 3.6804 | 0.1053 | 1.60729 | 59.4 |
| 11 | −3.4655 | 0.0042 | | |
| 12 | 1.1405 | 0.1761 | 1.60311 | 60.7 |
| 13 | 2.0668 | 0.2688 | | |
| 14 | 1.4127 | 0.2058 | 1.60311 | 60.7 |
| 15 | −5.6582 | 0.994 | | |
| 16 | 1.1910 | 0.0625 | 1.80518 | 25.4 |
| 17 | 1.2267 | 0.1072 | | |
| 18 | 859.5100 | 0.1367 | 1.70154 | 41.1 |
| 19 | −0.8310 | | | |

Lens Separation during Zooming

| f | $D_9$ |
|---|---|
| 1.0 | 0.8728 |
| 1.2 | 0.4603 |
| 1.5 | 0.0478 |

Figuring constants for the non-spherical surfaces at $R_3$ and $R_{19}$ $$\begin{cases} B_3 = 0.02809 \\ C_3 = 0.00253 \end{cases} \text{or} \begin{cases} \psi_3 = 0.1626 \\ \Omega_3 = 0.08785 \end{cases}$$

$$\begin{cases} B_{19} = 0.09386 \\ C_{19} = 0.00004336 \end{cases} \text{or} \begin{cases} \psi_{19} = -0.5268 \\ \Omega_{19} = -0.001460 \end{cases}$$

The diaphragm aperture is located at a distance of 0.2063 rearwardly from the surface $R_{13}$.

| No. | $\alpha$ | h | $\bar{\alpha}$ | $\bar{h}$ |
|---|---|---|---|---|
| 1 | 0.000000 | 1.000000 | −1.000000 | −1.274484 |
| 2 | 0.269350 | 0.985022 | −1.343282 | −1.199789 |
| 3 | −0.342378 | 1.159379 | −0.598178 | −0.895166 |
| 4 | −0.342569 | 1.213963 | −0.598030 | −0.799877 |
| 5 | −0.125276 | 1.224037 | −0.741204 | −0.740275 |
| 6 | −0.328968 | 1.239503 | −0.618015 | −0.711219 |
| 7 | −0.397725 | 1.286271 | −0.578563 | −0.643186 |
| 8 | −1.225590 | 1.609446 | −0.164597 | −0.599784 |
| 9 | −0.510430 | 1.669129 | −0.431113 | −0.549376 |
| 10 | −0.600000 | 2.192809 | −0.401631 | −0.198832 |
| 11 | −0.238175 | 2.208418 | −0.434440 | −0.170360 |
| 12 | 0.148829 | 2.207798 | −0.464294 | −0.168426 |
| 13 | 1.316306 | 2.063228 | −0.553357 | −0.107651 |
| 14 | 0.714236 | 1.871277 | −0.521943 | 0.032621 |
| 15 | 1.513127 | 1.676991 | −0.508016 | 0.097851 |
| 16 | 1.691877 | 1.508769 | −0.497587 | 0.147326 |
| 17 | 0.671863 | 1.485508 | −0.597187 | 0.168002 |
| 18 | −0.303223 | 1.518019 | −0.707463 | 0.243854 |
| 19 | −0.301984 | 1.542288 | −0.707264 | 0.300694 |
| | 1.000000 | | −0.453421 | |

Aberration Coefficient in Example 4

| | Wide Angle Setting | Medium Setting | Telephoto Setting |
|---|---|---|---|
| L | 0.001936 | −0.000395 | −0.004580 |
| T | 0.000587 | 0.000599 | 0.000614 |
| LS | −0.017518 | −0.011383 | −0.006659 |

| | Wide Angle Setting | Medium Setting | Telephoto Setting |
|---|---|---|---|
| I | 1.51579 | 1.81878 | 2.16232 |
| II | −0.14942 | −0.11142 | −0.06800 |
| III | −0.02710 | −0.03299 | −0.03721 |
| P | 0.10785 | 0.10785 | 0.10785 |
| V | 0.22994 | 0.10708 | −0.03159 |
| $I^s$ | −0.11241 | −0.07953 | −0.04441 |
| $I^*$ | −120.96575 | −167.28250 | −161.40807 |
| $II^*$ | −19.21069 | −19.54677 | −3.58358 |
| $I_F$ | −2.63640 | −2.07626 | 0.77706 |
| $II_p$ | 1.36698 | 1.20133 | 1.23430 |
| $\hat{I}$ | −8.04652 | −8.94594 | −8.80755 |
| $\hat{II}$ | 0.71884 | 0.31677 | 0.09582 |
| $\hat{III}$ | 0.29632 | 0.26716 | 0.18138 |
| $\hat{IV}$ | −0.29792 | −0.22409 | −0.22902 |
| $\hat{V}_*$ | −0.94590 | −0.40465 | −0.15325 |
| $II_Z$ | 0.29027 | 0.34099 | 0.40337 |
| $I_Z$ | 3.50262 | 3.96119 | 4.77284 |
| $II_Z$ | −0.22580 | −0.12772 | −0.05376 |

EXAMPLE 5

Figure 9A:
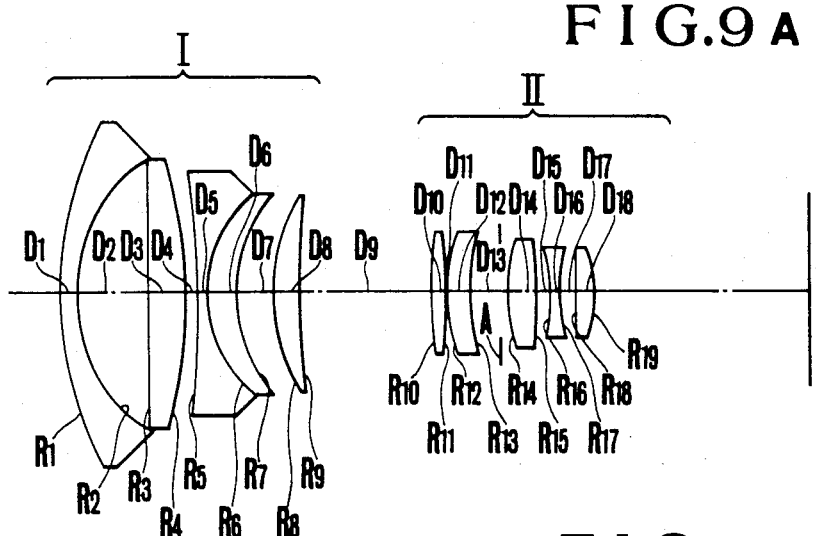
FIG. 9 is block diagrams of a fifth example of a zoom lens according to the invention at wide angle, medium and telephoto settings respectively shown in FIGS. 9A, 9B and 9C.
Figure 9B:
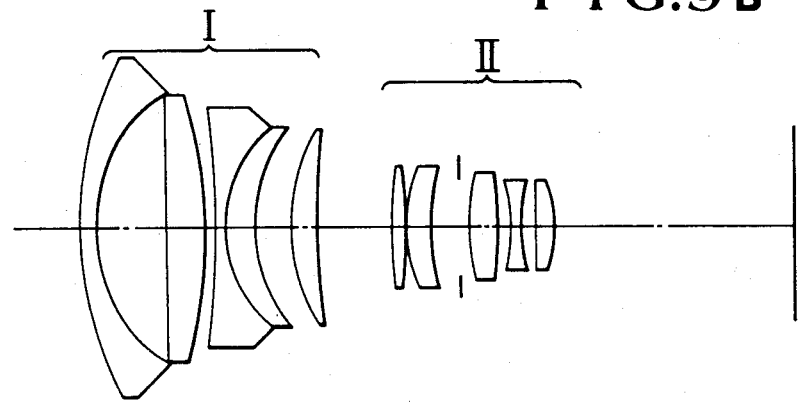
Figure 9C:
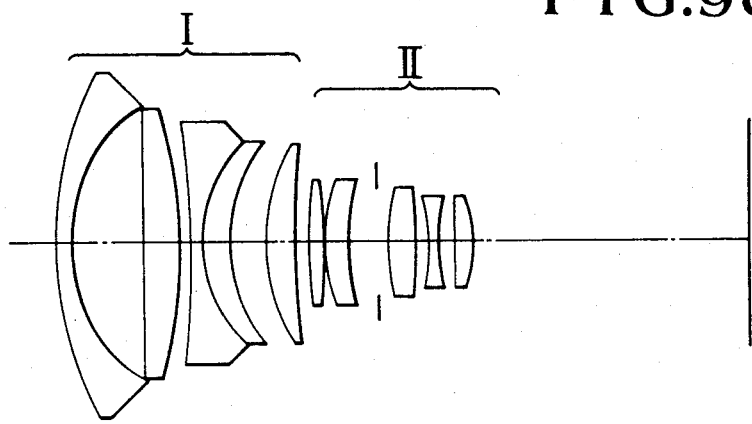
Figure 10A:
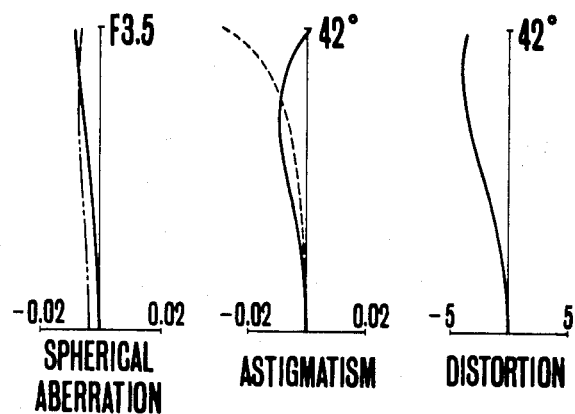
FIGS. 10A, 10B and 10C are curves of aberration of the zoom lens of FIG. 9 at the wide angle, medium and telephoto settings respectively.
Figure 10B:
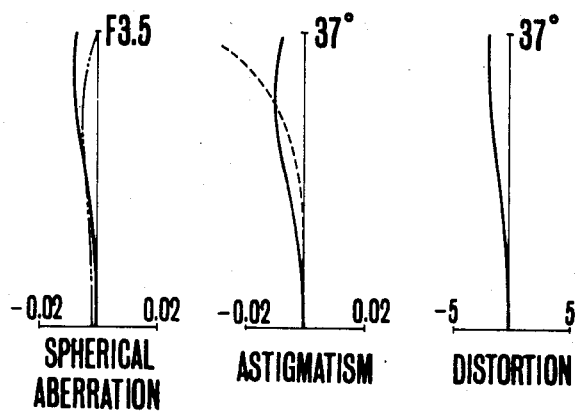
Figure 10C:
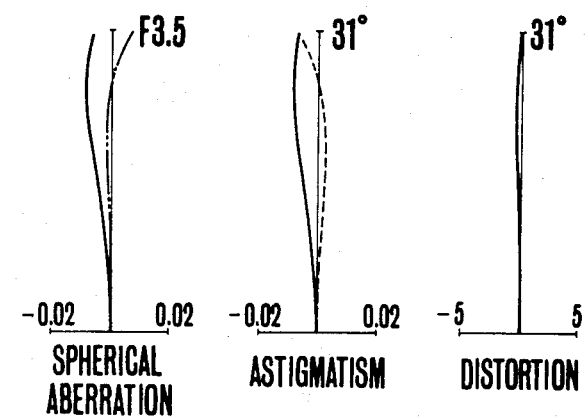

The fifth example of the zoom lens of the invention is shown in FIGS. 9A, 9B and 9C for the wide angle setting, a medium setting and the telephoto setting respectively, and may be constructed in accordance with the numerical data given below. In this example, the 4th and 19th surfaces are non-spherical. The states of correction of aberrations achieved in this example at the wide angle, medium and telephoto settings are shown in FIGS. 10A, 10B and 10C respectively.

f=1.0–1.5 F/3.5 Image Angle: 84°–62°

| No. | R | D | N | Vd |
|---|---|---|---|---|
| $f_1 =$ −1.6667 { 1 | 2.7390 | 0.0958 | 1.72342 | 38.0 |
| 2 | 1.1330 | 0.5131 | | |
| 3 | −60.3069 | 0.2554 | 1.61293 | 37.0 |
| 4 | −3.6505 | 0.0758 | | |
| 5 | −9.5261 | 0.0833 | 1.77250 | 49.6 |
| 6 | 0.9232 | 0.2016 | 1.71736 | 29.5 |
| 7 | 1.1096 | 0.2632 | | |
| 8 | 1.3978 | 0.1924 | 1.64769 | 33.8 |
| 9 | 6.6991 | 0.8818∼0.0568 | | |
| $f_2 =$ 1.4844 { 10 | 3.8212 | 0.1054 | 1.60729 | 59.4 |
| 11 | −3.0792 | 0.0042 | | |
| 12 | 1.1753 | 0.1753 | 1.60311 | 60.7 |
| 13 | 2.0520 | 0.2687 | | |
| 14 | 1.3874 | 0.2052 | 1.60311 | 60.7 |
| 15 | −5.2075 | 0.1019 | | |
| 16 | −1.1647 | 0.0625 | 1.80518 | 25.4 |
| 17 | 1.2412 | 0.1104 | | |
| 18 | −21.5094 | 0.1369 | 1.70514 | 41.1 |
| 19 | 0.8107 | | | |

Lens Separation during Zooming

| F | $D_9$ |
|---|---|
| 1.0 | 0.8818 |
| 1.2 | 0.4693 |
| 1.5 | 0.0568 |

Figuring constants for the non-spherical surfaces at $R_4$ and $R_{19}$ $$\begin{cases} B_4 = -0.02020 \\ C_4 = -0.006759 \end{cases} \text{or} \begin{cases} \psi_4 = 0.1169 \\ \Omega_4 = 0.02276 \end{cases}$$

-continued $$\begin{cases} B_{19} = 0.08513 \\ C_{19} = 0.00004255 \end{cases} \text{ or } \begin{cases} \psi_{19} = -0.4927 \\ \Omega_{19} = -0.001433 \end{cases}$$

The diaphragm aperture is located at a distance of 0.2062 rearwardly from surface $R_{13}$.

| No. | α | h | $\bar{\alpha}$ | $\bar{h}$ |
|---|---|---|---|---|
| 1 | 0.000000 | 1.000000 | −1.000000 | −1.263681 |
| 2 | 0.264119 | 0.985313 | −1.333762 | −1.189515 |
| 3 | −0.364988 | 1.172579 | −0.574276 | −0.894870 |
| 4 | −0.376905 | 1.232257 | −0.565181 | −0.805380 |
| 5 | −0.170007 | 1.245142 | −1.700405 | −0.752299 |
| 6 | −0.270979 | 1.257882 | −0.639399 | −0.722238 |
| 7 | −0.346109 | 1.298518 | −0.596262 | −0.652231 |
| 8 | −1.185583 | 1.610558 | −0.174604 | −0.606276 |
| 9 | −0.439325 | 1.661869 | −0.455524 | −0.553073 |
| 10 | −0.600000 | 2.190924 | −0.402051 | −0.198561 |
| 11 | −0.251801 | 2.207442 | −0.433608 | −0.170117 |
| 12 | 0.183557 | 2.206677 | −0.467159 | −0.168171 |
| 13 | 1.315921 | 2.062661 | −0.553456 | −0.107600 |
| 14 | 0.709692 | 1.871970 | −0.521832 | 0.032615 |
| 15 | 1.523472 | 1.676981 | −0.507654 | 0.097589 |
| 16 | 1.717694 | 1.501969 | −0.496352 | 0.148161 |
| 17 | 0.679379 | 1.478447 | −0.588776 | 0.168892 |
| 18 | −0.279731 | 1.509320 | −0.708341 | 0.247068 |
| 19 | −0.328958 | 1.535790 | −0.716399 | 0.304714 |
|  | 1.000000 |  | −0.452722 |  |

Aberration Coefficient in Example 5

|  | Wide Angle Setting | Medium Setting | Telephoto Setting |
|---|---|---|---|
| L | 0.002116 | −0.000153 | −0.004222 |
| T | 0.000281 | 0.000307 | 0.000340 |
| LS | −0.017483 | −0.011373 | −0.006677 |
| I | 1.60791 | 1.86955 | 2.07581 |
| II | −0.12658 | −0.06544 | 0.01007 |
| III | −0.03435 | −0.03794 | −0.04084 |
| P | 0.11012 | 0.11012 | 0.11012 |
| V | 0.24614 | 0.11086 | 0.02848 |
| $I^s$ | −0.12370 | −0.08247 | −0.04504 |
| I* | −106.37290 | −145.00256 | −120.53203 |
| II* | −21.69655 | −23.63549 | −11.29596 |
| $I_F$ | −3.25061 | −3.00289 | −0.65495 |
| $II_P$ | 1.17628 | 1.03580 | 1.07509 |
| $\bar{I}$ | −8.50560 | −0.67127 | −9.98235 |
| $\bar{II}$ | 0.57483 | 0.19246 | −0.02389 |
| $\bar{III}$ | 0.31269 | 0.27550 | 0.18842 |
| $\bar{IV}$ | −0.27989 | −0.21640 | −0.22544 |
| $\bar{V}$ | −0.95939 | −0.40540 | −0.15349 |
| $IIz^*$ | 0.31958 | 0.35631 | 0.39836 |
| Iz | 3.14172 | 3.45302 | 3.93935 |
| IIz | −0.18771 | −0.07389 | 0.01034 |

EXAMPLE 6

Figure 11A:
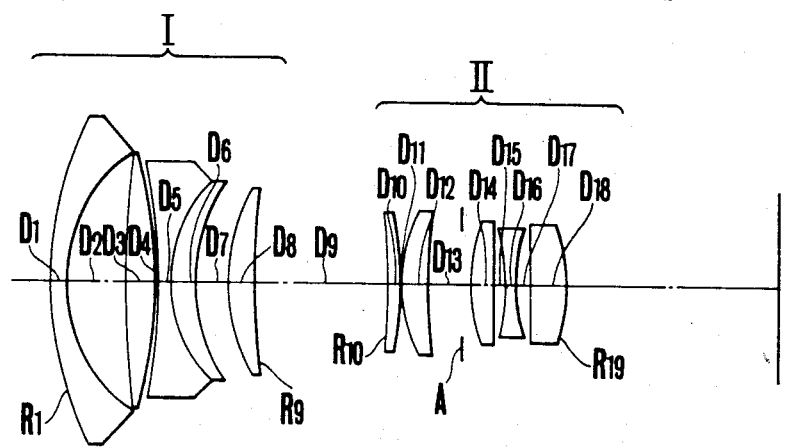
FIG. 11 is block diagrams of a sixth example of a zoom lens of the invention at wide angle, medium and telephoto settings respectively shown in FIGS. 11A, 11B and 11C.
Figure 11B:
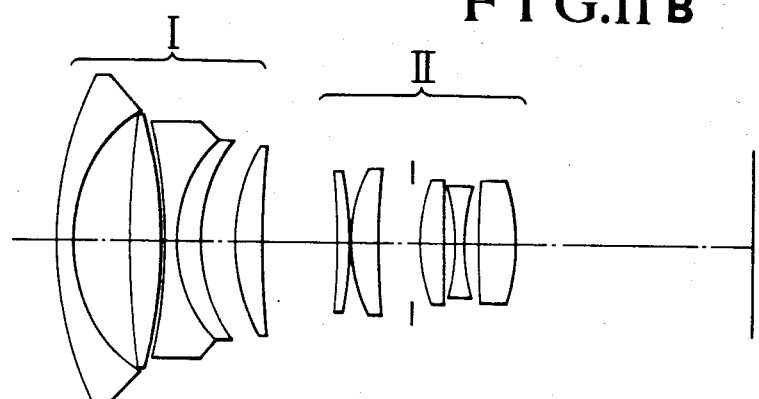
Figure 11C:
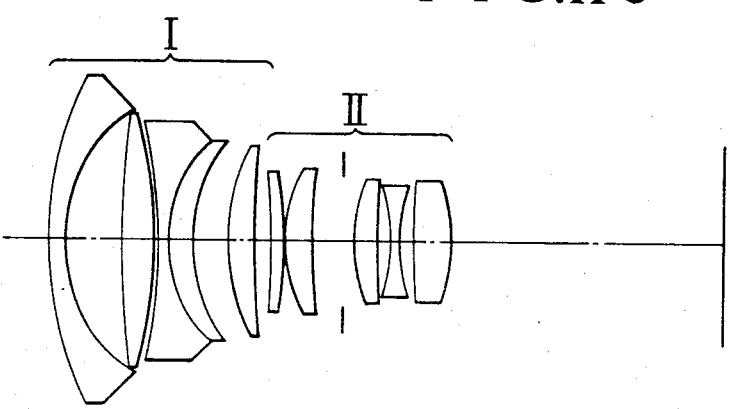
Figure 12A:
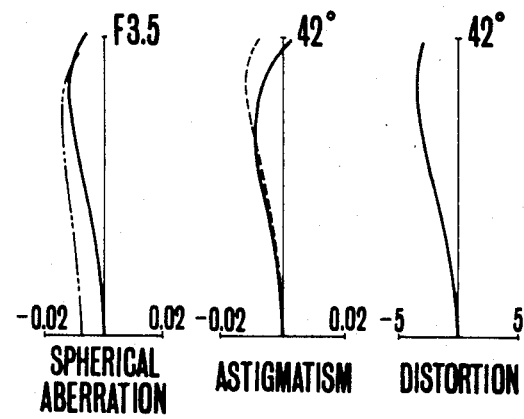
FIGS. 12A, 12B and 12C are curves of aberration of the zoom lens of FIG. 11 at the wide angle, medium and telephoto settings respectively.
Figure 12B:
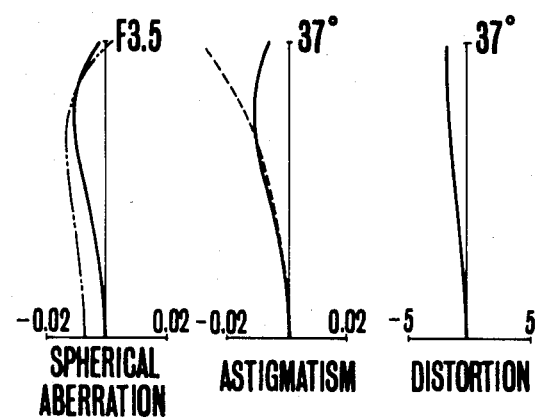
Figure 12C:
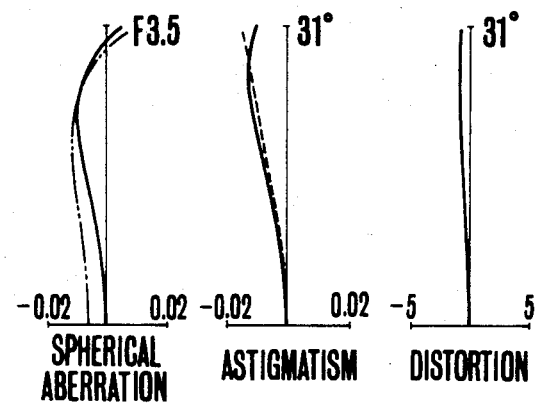

The sixth example of the zoom lens of the invention is shown in FIGS. 11A, 11B and 11C for the wide angle setting, a medium setting and the telephoto setting respectively, and may be constructed in accordance with the numerical data given below. In this example, the 1st and 19th surfaces are non-spherical. The states of correction of aberrations achieved in this example at the wide angle, medium and telephoto settings are shown in FIGS. 12A, 12B and 12C respectively.

f=1.0−1.5 F/3.5 Image Angle: 84°−62°

| | No. | R | D | N | V |
|---|---|---|---|---|---|
| | 1 | 3.1283 | 0.0958 | 1.72342 | 38.0 |
| | 2 | 1.0992 | 0.4335 | | |
| | 3 | 8.8270 | 0.2063 | 1.61293 | 37.0 |
| $f_1 =$ | 4 | −3.2427 | 0.0143 | | |
| −1.6667 | 5 | −4.4405 | 0.0833 | 1.77250 | 49.6 |
| | 6 | 0.9477 | 0.1864 | 1.71736 | 29.5 |
| | 7 | 1.2002 | 0.2500 | | |
| | 8 | 1.4672 | 0.1921 | 1.64769 | 33.8 |
| | 9 | 7.5714 | 0.8851∼0.0601 | | |
| | 10 | −10.5053 | 0.0995 | 1.60311 | 60.7 |
| | 11 | −2.5645 | 0.0042 | | |
| | 12 | 1.0342 | 0.1920 | 1.60311 | 60.7 |
| $f_2 =$ | 13 | 3.9906 | 0.3065 | | |
| 1.4844 | 14 | 1.2515 | 0.1716 | 1.60311 | 60.7 |
| | 15 | 20.2809 | 0.0804 | | |
| | 16 | −1.7496 | 0.0625 | 1.80518 | 25.4 |
| | 17 | 1.1255 | 0.1022 | | |
| | 18 | 6.5772 | 0.2752 | 1.80610 | 40.9 |
| | 19 | −1.2218 | | | |

Lens Separation during Zooming

| f | $D_9$ |
|---|---|
| 1.0 | 0.8851 |
| 1.2 | 0.4726 |
| 1.5 | 0.0601 |

Figuring constants for the non-spherical surfaces at $R_1$ and $R_{19}$.

$$\begin{cases} B_1 = 0.01885 \\ C_1 = 0.00172 \end{cases} \text{ or } \begin{cases} \psi_1 = 0.1091 \\ \Omega_1 = 0.05973 \end{cases}$$

$$\begin{cases} B_{19} = 0.08853 \\ C_{19} = 0.13162 \end{cases} \text{ or } \begin{cases} \psi_{19} = -0.5709 \\ \Omega_{19} = -5.0929 \end{cases}$$

The diaphragm aperture is located at a distance of 0.2440 rearwardly from the surface $R_{13}$.

| No. | α | h | $\bar{\alpha}$ | $\bar{h}$ |
|---|---|---|---|---|
| 1 | 0.000000 | 1.000000 | −1.000000 | −1.164659 |
| 2 | 0.231249 | 0.987141 | −1.269327 | −1.094076 |
| 3 | −0.418416 | 1.168507 | −0.549284 | −0.855984 |
| 4 | −0.337277 | 1.211644 | −0.608722 | −0.778129 |
| 5 | −0.100251 | 1.213191 | −0.755805 | −0.767328 |
| 6 | −0.319308 | 1.228203 | −0.622314 | −0.758070 |
| 7 | −0.390772 | 1.269237 | −0.579369 | −0.677233 |
| 8 | −0.149363 | 1.556530 | −0.174604 | −0.633589 |
| 9 | −0.462243 | 1.610417 | −0.454298 | −0.580628 |
| 10 | −0.600000 | 2.141485 | −0.404630 | −0.222485 |
| 11 | −0.722943 | 2.186374 | −0.391857 | −0.198153 |
| 12 | −0.208760 | 2.187244 | −0.438458 | −0.196326 |
| 13 | 1.066807 | 2.059476 | −0.552952 | −0.130101 |
| AP | 0.755555 | 1.875152 | −0.533290 | 0.000000 |
| 14 | 0.755555 | 1.827936 | −0.533290 | 0.033331 |
| 15 | 1.636423 | 1.652738 | −0.517228 | 0.088704 |
| 16 | 1.587274 | 1.525095 | −0.519866 | 0.130510 |
| 17 | 0.885407 | 1.494440 | −0.579928 | 0.150588 |
| 18 | −0.183672 | 1.513220 | −0.687655 | 0.220901 |
| 19 | 0.001787 | 1.512948 | −0.660581 | 0.321559 |
|  | 1.000000 |  | −0.448424 |  |

Aberration Coefficient in Example 6

|  | Wide angle Setting | Medium Setting | Telephoto Setting |
|---|---|---|---|
| L | 0.006295 | 0.005465 | 0.003888 |
| T | 0.001097 | 0.001153 | 0.001224 |
| LS | −0.015582 | −0.010138 | −0.005937 |
| I | 1.79689 | 2.05961 | 2.06139 |

-continued

|  | Wide angle Setting | Medium Setting | Telephoto Setting |
|---|---|---|---|
| II | −0.00047 | 0.02017 | 0.01178 |
| III | −0.01397 | −0.00907 | −0.00492 |
| P | 0.10765 | 0.10765 | 0.10765 |
| V | 0.21985 | 0.11106 | 0.04355 |
| I^s | −0.03328 | −0.04583 | −0.03194 |
| I* | −110.13489 | −155.29774 | −183.31447 |
| II* | −14.40455 | −16.54563 | −10.69619 |
| I_F | −3.85138 | −3.85619 | −2.71460 |
| II_P | 0.41627 | 0.30896 | 0.28786 |
| Î | −8.44452 | −9.70400 | −10.91943 |
| ÎI | −0.15906 | −0.50519 | −0.72425 |
| IÎI | 0.12861 | 0.08409 | 0.02002 |
| ÎV | −0.47587 | −0.39867 | −0.36368 |
| V̂ | −1.03655 | −0.45993 | −0.18156 |
| IIz* | 0.24366 | 0.25989 | 0.24249 |
| Iz | 3.94177 | 4.36512 | 5.04278 |
| IIz | 0.00673 | 0.03236 | 0.01949 |

What is claimed is:

1. A zoom lens comprising:
a first lens group having a plurality of lenses and having a total negative refractive power;
a second lens group having a plurality of lenses, a diaphragm incorporated therein and a total positive refractive power and being positioned closer to an image plane than the first lens group;
means for varying the distance between the first lens group and the second lens group for zooming;
a first aspheric surface having a positive 3rd-order aspheric coefficient and being positioned at the 1-th surface of the first lens group; and
a second aspheric surface having a negative 3rd-order aspheric coefficient and being positioned at the j-th surface closer to the image plane than the diaphragm of the second lens group;
in which the following condition is satisfied $$\Delta Vi + \Delta Vj < 0$$

where $\Delta Vi$ represents changes in the 3rd-order distortion aberration caused by the first aspherical surface and $\Delta Vj$ represents changes in the 3rd-order distortion aspherical surface caused by the second aspherical surface.

2. A zoom lens according to claim 1, in which astigmatism and field curvature caused by the first aspherical surface are almost cancelled by astigmatism and field curvature caused by the second aspheric surface.

* * * * *